June 15, 1943. A. G. PERKINS 2,321,616
MILK-FLOW INDICATOR FOR MILKING MACHINES
Filed May 5, 1941
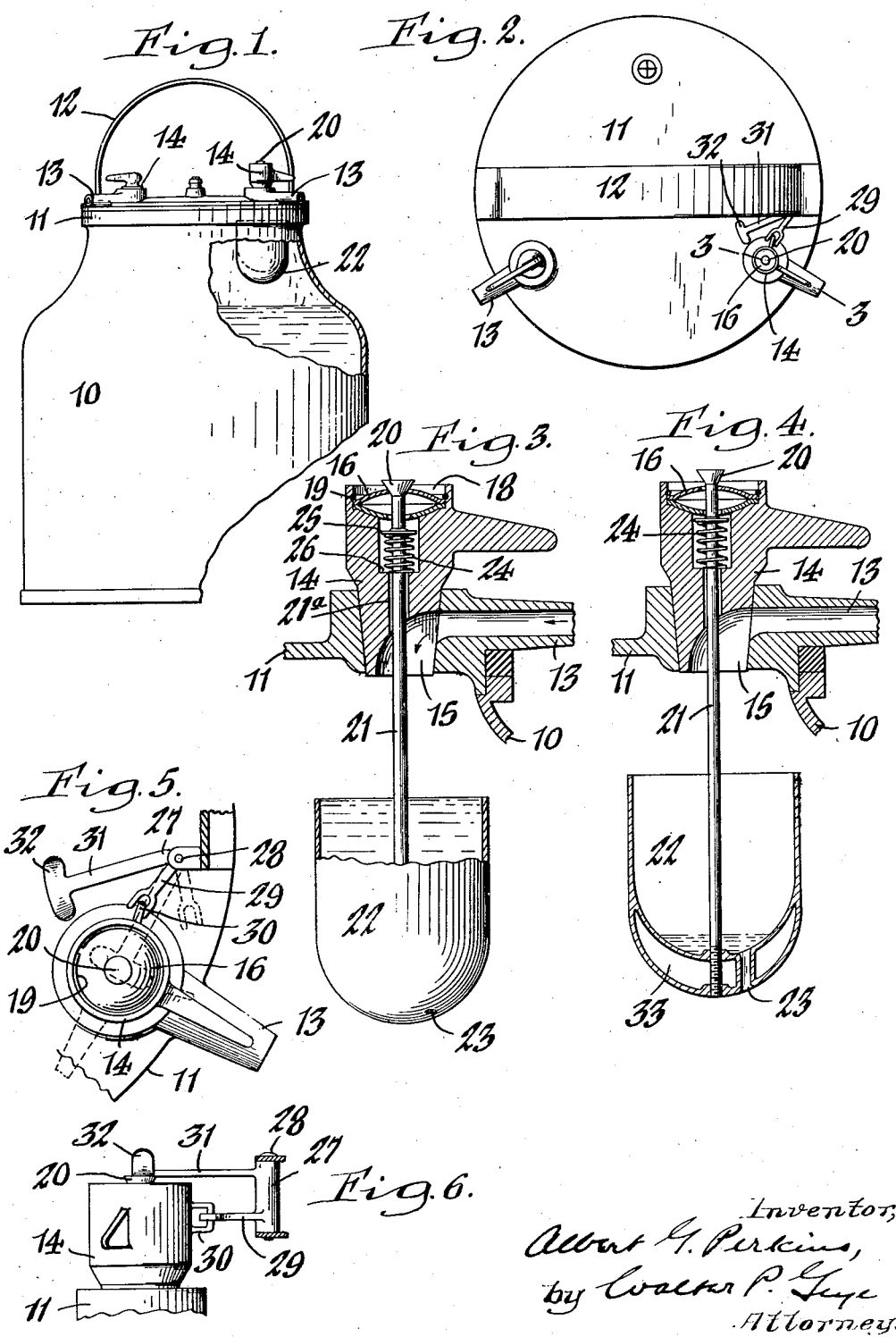

Patented June 15, 1943

2,321,616

UNITED STATES PATENT OFFICE 2,321,616

MILK-FLOW INDICATOR FOR MILKING MACHINES

Albert G. Perkins, Warsaw, N. Y.

Application May 5, 1941, Serial No. 392,019

14 Claims. (Cl. 31—86)

This invention relates generally to improvements in milking machines but more particularly to a warning signal or alarm device for indicating when the cow has been milked out or when the danger period in the milking operation has been reached.

It has for one of its objects to provide a signaling device of this character which is so designed and constructed as to be automatically rendered operable when the flow of milk from the cow is reduced to a minimum or below its normal rate of flow.

Another object of the invention is to provide a milk-flow governed signal of this character which is simple, compact and inexpensive in construction, which is positive and reliable in operation, and which can be easily cleaned.

A further object is to provide a signal appliance for milking machines which is so designed as to be readily applied to such machines, which is operable by the vacuum employed in the milking operation of such machines, and which, when rendered operative by a reduction in the normal flow of milk extracted from the cow, serves to break the vacuum in the machine and prevents the latter from operating in its normal manner.

A still further object is to provide a vacuum-operated signaling device for milking machines including a milk-flow control valve normally urged to an open, signal-operating position and having means for releasably retaining such valve in a closed position when the vacuum controlling cock of the machine is in its "shut-off" position.

Other features of the invention reside in the construction and arrangement of parts hereinafter described and particularly pointed out in the appended claims.

In the accompanying drawing:

Figure 1 is a sectional elevation of the milk-receiving can and associated parts of a milking machine showing my signal device applied thereto. Figure 2 is an enlarged top plan view of the can-cover or top and associated parts. Figures 3 and 4 are enlarged cross sectional views taken in the plane of line 3—3, Figure 2, and showing the signal device in its inoperative and operative positions, respectively. Figure 5 is a top plan view, partly in section of the means for releasably retaining the signal control valve in its closed position. Figure 6 is a side view thereof, partly in section.

Similar characters of reference indicate corresponding parts throughout the several views.

It is a common occurrence in all dairies where milking machines are used that the machines are left on the cows too long, either by neglect or otherwise, with the result that the cow's udder is injured thereby and contracts a disease known as mastitis. The purpose of this invention is to provide a signalling device for such machines which will be automatically rendered operative when the flow of milk delivered by the machine is reduced below the normal rate of flow, at which time an audible alarm will be given to indicate to the operator that the milking machine should be disconnected.

By way of example, I have shown my signaling device applied to a milking machine of usual construction, 10 indicating the milk-receiving can or pail having an operating top or cover 11 applied to its upper end in airtight engagement therewith and normally held firmly and tightly to the pail by the vacuum employed in the milking operation. A bail 12 projects upwardly from this cover for facilitating the carrying of the pail. Applied to this top are the usual valved intakes 13 by which the milk is delivered to the pail, these intakes being connected by the customary flexible tubes to the teat cups, not shown. Associated with each intake 13 is a valve-plug or cock 14 having a port 15 therein for registration with such intake when the machine is in operation. When it is desired to shut off the machine, this cock is turned approximately 90° to bring its port out of registration with the intake.

While my improved flow-control signal may be mounted in any appropriate place on the pail 10 where it is in the path of flow of the milk delivered through one of the intakes 13 and ports 15 to the pail, it is by preference mounted on the top 11 and suspended therefrom in the manner shown in the drawing. As there shown, the signalling device is suspended from one of the cocks 14 and consists of a vacuum-operated signal or alarm device which is preferably in the form of whistle 16 removably seated in a socket or recess 18 formed in the upper end of the cock and held in place therein by a split, retaining wire 19, and a valve 20 cooperating with the whistle for rendering it operative or inoperative. This valve is applied to the upper end of a stem 21 guided in the cock 14 and provided at its lower end in the path of the milk delivered to the pail through the intake 13 with a receptacle 22 which is open at its upper end and provided at its lower end with a drain opening 23. A spring 24 applied to this stem and bearing at its upper end against a collar 25 fixed on the stem and at its lower end against an opposing shoulder 26 formed on the cock, serves to normally urge the valve-stem to an elevated position, as shown in Figure 4 and in which position the valve is opened to render the signal operative. As shown in Figure 3, the opening 21ª in the cock through which the valve stem passes is somewhat larger in diameter than the cross section of the valve stem 21, so that the vacuum in the pail can pass therethrough and exhaust into the atmosphere when the valve 20 is opened to operate the whistle. When the valve is closed, as when the receptacle 22 is lowered by the weight of the milk delivered thereto, the valve 20 is closed and the whistle rendered inoperative. The spring 24 is strong enough to lift the valve to its open position against the vacuum present in the pail, as when the receptacle is empty or partially so, and is light enough to permit closing of the valve when the receptacle is filled or approximately filled.

When the milking machine is set up for operation the signalling device is in the position shown in Figure 4 with the receptacle 22 in its elevated position and the valve 20 in its open position, at which time the whistle 19 is rendered operative. However, the whistle is only operative for a second or two at the start of the milking operation, after which time sufficient milk is intercepted by the receptacle to lower the latter and close the valve to render the alarm inoperative. As soon as the flow of milk delivered to the pail is reduced below its normal rate of flow, the milk contained in the receptacle is discharged through its drain opening 23 at a faster rate than that delievered by the machine, and at a predetermined time the spring 24 causes the stem 21 and associated parts to be elevated resulting in the opening of the valve 20 and the blowing of the whistle 16, indicating to the operator that the milking machine should be shut off. During the normal flow of milk to the pail, the rate of discharge of the milk from the receptacle 22 is less than that of the amount of milk flowing into the receptacle.

Means are provided for manually shutting off the whistle 16 when the cock 14 is moved to its "shut-off" position. For this purpose, a horizontally-swinging member, indicated generally by the numeral 27, is pivoted at 28 to the top 11 alongside the cock, such member including an arm 29 bifurcated at its outer end for coupling engagement with a lug 30 projecting radially from the cock, so that when the latter is turned to its "on" or "off" position the member 27 is rocked in corresponding directions. Also projecting from this member 27 is a second arm 31 having a flexible end portion 32 which is adapted to be projected to and from a position in overhanging relation to the valve 20, so that when the cock is moved to its "shut-off" position, said valve is depressed and retained in its closed position to render the whistle 16 inoperative. As soon as the cock is moved to its open position, the member 27 is rocked in a direction to move the arm 31 laterally to the position shown by full lines in Figure 5. By constructing the coupling connection 29, 30 as shown, the cock 14 may be removed when desired without disturbing the horizontally-swinging member 27 and its associated parts.

If desired, the receptacle 22 may be provided with a chambered bottom 33 to render it more responsive to a floating action should the pail 10 become practically filled with milk before the whistle 16 is rendered operative in the manner heretofore described. Under such circumstances, the receptacle will be floated and thereby cause the stem 21 to be elevated and open the valve 20 and give the alarm. By this construction, the alarm is rendered operative either when the flow of milk delivered to the pail is reduced below normal or when the capacity of the pail has been reached.

I claim as my invention:

1. The combination with a vacuum milking machine, of a receptacle adapted for suspension from the cover of a milk-receiving can in communication with the flow of milk thereto and from which receptacle the milk is discharged at a predetermined rate, a yieldingly-suspended member guided on said cover and rising from the receptacle for elevating it when substantially empty, and a vacuum-operated, audible signal device applied exteriorly of the cover in operative-governed relation to said receptacle-member and rendered operative thereby when the receptacle is drained of its milk content by reason of the flow of milk delivered by the machine being less than the rate of discharge of the milk from the receptacle.

2. The combination with a milking machine, of a receptacle having a supporting stem rising therefrom and adapted for suspension in a milk-receiving can in communication with the flow of milk thereto, said receptacle having a drain opening therein and said stem having a signal control element thereon, a spring acting on said stem for urging the receptacle, at a predetermined time in its drained condition, to an elevated signal-rendering position, and a signal device disposed in operative relation to said stem-bearing control element and rendered operative thereby when the flow of milk delivered by the machine is less than the rate of discharge of the milk from the receptacle.

3. A device of the character described, comprising a valve-body having an opening extending therethrough, a vacuum-operated alarm device fitted in said body in operative communication with the opening thereof, a stem guided in said body for movement axially thereof and having a part at the upper end thereof in operative relation to said alarm device to control it, a spring applied to said stem for normally urging the same in a direction to bring its alarm-controlling part to an alarm-rendering position, and a receptacle applied to the lower end of said stem, said receptacle being open at its upper end and having a drain port in the bottom thereof.

4. In a milking machine, a signalling device consisting of a whistle operative by the vacuum employed in the milking operation, and flow control means in communication with the milk drawn by the machine and operatively connected to said signalling device for rendering the same operative when the flow of milk delivered by the machine is reduced below the normal rate of flow, said flow control means including a yieldingly suspended receptacle having a drain opening therein and a part in governing relation to the signalling device.

5. The combination with a milking machine having a can-engaging cover, a signaling device applied thereto and operative by the vacuum employed in the milking operation, and flow-controlled means operatively connected to said signaling device for rendering the same operative when the flow of milk delivered by the machine is reduced below its normal rate of flow, said flow-controlled means including a normally upwardly-urged suspension member guided on said cover and having means at its upper end in operative governing relation with the signaling device and a receptacle at its lower end having a drain opening therein and in communication with the milk drawn by the machine.

6. The combination with a milking machine having a can-engaging cover, of a vacuum-operated alarm applied to said cover, and means yieldingly suspended from said cover in substantially axial alinement with said alarm and having a ported, milk-receiving receptacle at its lower end and an alarm-governing element at its other end.

7. The combination with a milking machine having a can-engaging cover, of a vacuum-operated whistle applied to said cover, a stem yieldingly suspended from the cover for displacement relative to the whistle and provided at its upper end with a valve for controlling the whistle, and a milk-receiving receptacle at the lower end of said stem for receiving a portion of the milk drawn by the machine to thereby lower the stem and close the valve against the whistle, said receptacle having a discharge port therein for draining the milk therefrom to cause the elevation of the stem and the opening of said whistle-control valve at a predetermined time in the milking operation.

8. The combination with a milking machine having a can-engaging cover and a valve plug therein, of a vacuum-operated alarm device applied to said valve plug and including a valve element for governing the same, and flow-control means suspended from said plug in the communicating path of the milk delivered to the can and in operative governing engagement with the valve element of said alarm device for rendering the latter inoperative when the flow of milk to the can is normal and operative when such flow is below the normal rate of flow.

9. In a milking machine, a pneumatically-operated alarm device applied thereto and operated by the vacuum used in the milking operation of the machine, a valve operatively associated with said alarm device and movable to and from an open or closed position to render such device operative or inoperative, a spring for normally urging said valve to an open position, and a milk-receiving receptacle connected to said valve to move therewith and governed by the rate of flow of milk delivered by the machine to initiate the opening or closing of said alarm-controlling valve, said receptacle having a drain opening therein.

10. The combination with a milking machine having a can-engaging cover, of a pneumatically-operated alarm device applied to said cover and operated by the vacuum used in the milking operation of the machine, a stem suspended from said cover for movement relative thereto and having a valve thereon in operative association with said alarm device to control it, a spring applied to said stem for normally urging said valve to an open alarm-rendering position, and a receptacle mounted on the lower end of said valve-stem for receiving a portion of the milk drawn by the machine and acting to close and maintain said valve closed during normal milking operations, said receptacle having a drain port therein for effecting the emptying of its milk-contents when the flow of milk is reduced below normal, whereby said stem-spring acts to open said valve and render the alarm device operative.

11. In a milking machine, a signal device operative by the vacuum employed in the milking operation, a normally open valve for controlling said signal, means connected to said valve for maintaining it closed during the normal milking operation and operative to open the same when the cow has been milked out, and means disposed in operative relation to said valve for releasably retaining it in its closed position when the vacuum to the machine is cut off.

12. The combination with a milking machine having a can-engaging cover and a valve for shutting off the vacuum to the teat cups thereof, of a signaling device mounted on said valve and operated by the vacuum employed in the milking operation, a milk-flow governed valve for controlling said signaling device and including means for normally urging it to an open signal-rendering position, and means rendered operative to close said signal-controlling valve when said vacuum controlling valve is shut off.

13. The combination with a milking machine having a can-engaging cover and a valve plug therein, of a pneumatically-operated alarm device applied to said valve plug and operated by the vacuum used in the milking operation of the machine, a valve operatively associated with said alarm device and movable to and from an open or closed position to render such device operative or inoperative, means operatively connected to said valve and governed by the rate of flow of milk delievered by the machine to initiate the opening or closing of said alarm-controlling valve, and means operatively connected to said valve plug and disposed for movement into engagement with the alarm-controlling valve for initiating the closing of the latter when said valve plug is moved from its open to its closed position.

14. The combination with a milking machine having a can-engaging cover, of a vacuum-operated alarm applied to said cover, a stem yieldingly suspended from said cover and provided at its upper end with a valve for controlling said alarm, and a milk-receiving receptacle at the lower end of said stem for suspension within the milk-receiving can and adapted to receive a portion of the milk delivered thereto by the machine to thereby lower the stem and close the valve against the alarm, said receptacle being in the form of a float to be elevated by the milk when its level in the can reaches a predetermined level to thereby release the valve from the alarm and render the same operative.

ALBERT G. PERKINS.